US007780348B2

(12) United States Patent
Houben et al.

(10) Patent No.: US 7,780,348 B2
(45) Date of Patent: Aug. 24, 2010

(54) TEMPERATURE SENSOR FOR A RESISTANCE THERMOMETER, IN PARTICULAR FOR USE IN THE EXHAUST GAS SYSTEM OF COMBUSTION ENGINES

(76) Inventors: Hans Houben, Flußweg 13, Würselen (DE) D-52146; Rüdiger Zaiser, Panoramastrasse 40, Freiberg (DE) D-71691; Friedrich Mayr, Uhlbergweg 6, Ostfildern (DE) D-73760; Helmut Buck, Im Espar 11, Erdmannhausen (DE) D-71729; Markus Mohl, Im Lauerbäumle 10, Marbach (DE) D-71672; Robert Hartmann, Obere Kelterstrasse 7, Tamm (DE) D-71732; Heiner Lehmann, Beuzlen 8, Ludwigsburg (DE) D-71642; Werner Schneider, Ziegelgartenstrasse 11/2, Vaihingen/Enz (DE) D-71665; Arno Marto, Burgunderstrasse 22, Weil der Stadt (DE) D-71263; Hans-Peter Kasimirski, Suevenstrasse 12, Ludwigsburg (DE) D-71640

( * ) Notice: Subject to any disclaimer, the term of this patent is extended or adjusted under 35 U.S.C. 154(b) by 121 days.

(21) Appl. No.: 11/827,805

(22) Filed: Jul. 13, 2007

(65) Prior Publication Data
US 2008/0080592 A1 Apr. 3, 2008

(30) Foreign Application Priority Data
Jul. 21, 2006 (DE) .................... 10 2006 034 248

(51) Int. Cl.
*G01K 7/00* (2006.01)
*G01K 1/00* (2006.01)
*H01C 1/03* (2006.01)

(52) U.S. Cl. ................ 374/185; 374/208; 374/148; 338/28; 338/229; 338/238

(58) Field of Classification Search ........... 374/185, 374/208, 148; 338/229, 238, 28
See application file for complete search history.

(56) References Cited

U.S. PATENT DOCUMENTS

| 5,309,133 | A | 5/1994 | Berger et al. |
| 6,501,366 | B2 | 12/2002 | Takahashi et al. |
| 6,997,607 | B2 | 2/2006 | Iwaya et al. |
| 7,439,845 | B2 * | 10/2008 | Houben et al. ........... 338/28 |
| 2002/0129960 | A1 | 9/2002 | Maus et al. |

FOREIGN PATENT DOCUMENTS

| DE | 3012787 A1 | 10/1981 |
| DE | 44 24 384 C2 | 9/1998 |
| DE | 100 34 265 A1 | 2/2001 |
| DE | 101 58 527 A1 | 1/2002 |
| DE | 10236036 B4 | 2/2006 |
| WO | WO 2005075949 A1 * | 8/2005 |

OTHER PUBLICATIONS

Translation of WO2005075949A1.*

* cited by examiner

*Primary Examiner*—Gail Verbitsky
*Assistant Examiner*—Mirellys Jagan

(57) ABSTRACT

The invention describes a temperature sensor for a resistance thermometer comprising
an electric measuring resistor (3) the resistance material of which consists either of a ceramic material or of a metallic resistance material in combination with a ceramic or a mineral carrier,
a protective tube (2) comprising a closed tip (2b) and a rear end that provides an access to the inner space of the protective tube (2) and that contains the measuring resistor (3) closely adjacent the closed tip (2b) of the protective tube (2),
at least one supply line (5) that is brought out through the rear end of the protective tube (2),
and an electrically insulating filler (6) based on a ceramic or a mineral material that fills the space between the protective tube (2) on the one side and the measuring resistor (3) and its at least one supply line (4, 5) on the other side. It is provided according to the invention that the packing density of the filler (6) has a gradient in lengthwise direction of the protective tube (2).

21 Claims, 3 Drawing Sheets

TEMPERATURE SENSOR FOR A RESISTANCE THERMOMETER, IN PARTICULAR FOR USE IN THE EXHAUST GAS SYSTEM OF COMBUSTION ENGINES

BACKGROUND OF THE INVENTION

1. Field of the Invention

The present invention relates to a temperature sensor for a resistance thermometer comprising an electric measuring resistor the resistance material of which consists either of a ceramic material or of a metallic resistance material in combination with a ceramic or a mineral carrier, a protective tube comprising a closed tip and a rear end that provides an access to the inner space of the protective tube and that contains the measuring resistor closely adjacent the closed tip of the protective tube, at least one supply line that is brought out through the rear end of the protective tube, and an electrically insulating filler based on a ceramic or a mineral material that fills the space between the protective tube on the one side and the measuring resistor and its at least one supply line on the other side. A temperature sensor of that kind has been known from DE 44 24 384 C2. It comprises a measuring resistor made from a resistance material, especially from platinum, arranged on a planar substrate. A metallic protective tube, equipped with a separate test prod, is provided for receiving the measuring resistor. The test prod consists of a tube, which is closed at its forward end and which is squeezed together, while it is still empty, over its forward section to form a planar narrower portion. The planar measuring resistor, which is introduced into the narrower portion, comprises connection lines that are extended in length by connection wires brought out through the rear open end of the test prod. After the measuring resistor has been pushed in, a polysilicate-based ceramic compound is filled into the test prod so as to fill the space still available in the test prod and to thereby fully embed the measuring resistor. The test prod so prepared is then welded to a longer metallic protective tube with the tapering test prod projecting from the tube. Inside the longer protective tube the connection wires extend in an air space and are connected with the conductors of a connection cable the sheath of which is fixed in a rear end portion of the protective tube by crimping. The described temperature sensor is relatively expensive to produce and not durable enough for application in an exhaust gas system of a combustion engine.

2. Description of the Related Art

The operating conditions of the temperature sensor in the exhaust gas system of combustion engines are severe. They are characterized by high temperatures of over 600° C. up to almost 1000° C., high temperature variations, for example by temperature rises by 800° C. in only 5 seconds, by vibration and by contact with aggressive agents flowing around the sensor. The known temperature sensor cannot withstand such conditions. Rapid temperature variations, in connection with the different coefficients of thermal expansion of the metallic connection wires on the one hand and the ceramic embedding compounds on the other hand, result in stresses that act on the connection wires and that may cause the connection wires to break. To leave the largest part of the protective tube free from ceramic embedding compound, as is proposed by DE 44 24 384 C2, does not provide a solution to that problem because the exposed connection wires are at risk to be damaged by the continuous vibrations, which also present a risk for the measuring resistor.

Temperature sensors of the kind disclosed by DE 102 54 637 B4 and DE 199 22 928 A1, where a thermistor embedded in a coagulated ceramic powder, for example aluminum oxide, is connected with a mineral-insulated cable which is in direct contact with the aluminum oxide embedding compound, are connected with similar disadvantages.

DE 100 34 265 A1 discloses a temperature sensor with a measuring resistor located in a closed protective tube where the resistor, instead of being embedded in an insulating ceramic material, is enclosed in an air chamber. The connection cable consists of a mineral-insulated metal-sheathed two-core cable welded to the rear section of the protective tube for the measuring resistor. In that case, the measuring resistor, extending freely in an air chamber in the protective tube, is especially exposed to the danger of being damaged by vibrations and responds slowly, being efficiently thermally insulated by the air surrounding it. In order to overcome that disadvantage it has been known from DE 101 58 527 A1 to provide openings in the tip of the protective tube, in the area of the measuring resistor, that permit the exhaust gas to enter the inner space and to flow around the measuring resistor. While this has the result that the temperature sensor responds to temperature variations more quickly, the measuring resistor is exposed to chemical attack by the exhaust gases, tends to get soiled by deposition of unburnt fuel residues, especially soot and condensate, which leads to the additional risk that an electric shunt will build up been the supply lines of the measuring resistor. Moreover, measuring resistors intended for being exposed to the exhaust gas in an open protective tube are considerably more expensive than measuring resistors that are intended for use in closed protective tubes.

BRIEF SUMMARY OF THE INVENTION

The demands placed on temperature sensors that are to be used in the exhaust gas system of combustion engines, which in part oppose each other, make it difficult to find a temperature sensor for use in the exhaust gas system of combustion engines of vehicles which not only is available at low cost but is also reliable, mechanically stable, durable, insensitive to chemical attack by the hot exhaust gas and which should respond quickly to temperature variations.

That object is achieved by a temperature sensor for a resistance thermometer comprising
an electric measuring resistor the resistance material of which consists either of a ceramic material or of a metallic resistance material in combination with a ceramic or a mineral carrier,
a protective tube comprising a closed tip and a rear end that provides an access to the inner space of the protective tube and that contains the measuring resistor closely adjacent the closed tip of the protective tube,
at least one supply line that is brought out through the rear end of the protective tube, and an electrically insulating filler based on a ceramic or a mineral material that fills the space between the protective tube on the one side and the measuring resistor and its at least one supply line on the other side, in which the packing density of the filler has a gradient in lengthwise direction of the protective tube.

Advantageous further developments of the invention are the subject-matter of the sub-claims.

The temperature sensor according to the invention comprises an electric measuring resistor the resistance material of which consists either of a ceramic material or of a metallic resistance material in combination with a ceramic or a mineral carrier. A protective tube, having a closed tip and a rear end that provides access to the inner space of the protective tube, contains the measuring resistor near the closed tip of the protective tube. At least one supply line of the measuring resistor is brought out through the rear end of the protective tube. A second supply line of the measuring resistor is either likewise brought out through the rear end of the protective tube or connected with the tip of the protective tube; in the latter case, the protective tube not only acts to protect the measuring resistor, but also serves as one of its supply lines. Inside the protective tube, the measuring resistor and its at least one supply line are embedded in a filler based on a ceramic or a mineral material. At the rear end of the protective tube, there is preferably provided a closure means which retains the filler material in the protective tube and through which the at least one supply line is brought out at the rear end of the protective tube. The packing density of the filler material in the protective tube is not uniform throughout, but has a gradient in the longitudinal direction of the protective tube. By increasing the packing density in certain areas it is possible to reduce the risky conditions produced by vibrations at those points and in their neighborhood. In contrast, by providing a reduced packing density in certain other areas, the risks produced by differences in thermal expansion between the ceramic and mineral components of the temperature sensor on the one hand and its metallic component on the other hand can be reduced in those areas.

By combining these features it has been possible to optimize the temperature sensor in a way that presents quite a number of advantages that could not be united before in view of the different demands placed on the temperature sensor which in part even were opposed one to the other.

The measuring resistor is enclosed and protected by a closed protective tube so that it is not exposed to attack by the hot exhaust gases. Rather, the hot exhaust gases act exclusively on the protective tube, for which suitable highly heat-resistant and chemically resistant metals and metal alloys are known.

The protective tube can be produced and used as a single piece, which is favorable in terms of low-cost production.

The measuring resistor is embedded in a ceramic filler which on the one hand protects the measuring resistor from vibration stresses typical for the particular application, and on the other hand ensures efficient heat transfer from the protective tube to the electric measuring resistor so that the latter will quickly respond to temperature variations.

The supply lines of the measuring resistor are likewise run through a filler based on a ceramic or mineral material, being thus not only insulated electrically but also protected mechanically, especially from the influence of vibrations produced by the engine and during operation of the vehicle.

Contrary to the prior art, embedding the measuring resistor and its at least one supply line in a filler based on a ceramic or mineral material has not nearly the same detrimental effects on the temperature resistor according to the invention when exposed to stresses caused by steep and high temperature ramps, as would be the case in the prior art, so that a clearly longer service life can be achieved. This advantage is obtained by an amazingly simple step, namely in that instead of packing the filler in the protective tube with uniform density, a packing density gradient is provided in the longitudinal direction of the protective tube.

Such a defined packing density gradient can be produced by simple means and does not, or only insignificantly, increase the cost of production of the measuring resistor, compared with a measuring resistor where such non-uniform packing density is not purposefully adjusted.

A lower packing density in certain areas facilitates relative movement between the measuring resistor and its supply lines on the one hand and the ceramic or mineral filler on the other hand so that the interaction between the measuring resistor and its supply lines on the one hand and the ceramic or mineral filler on the other hand, produced by the inevitable thermal expansion, will subject the measuring resistor and its supply lines to significantly lesser stresses than would be the case in the prior art. This is especially due to the presence of a minimum packing density of the filler material in the area of the supply lines.

Especially high risks for the measuring resistor result from vibrations. The invention responds to that fact by providing a locally higher density in the area of the measuring resistor or its neighborhood, especially in the area between the measuring resistor and the rear end of the protective tube, immediately adjacent the measuring resistor. That locally higher density is a precautionary measure in case vibrations should produce a cavity in the filler that would permit the measuring resistor to vibrate. It has been found that a lower packing density of the filler, combined with a locally higher density in the area of the measuring resistor, will reduce the response rate of the temperature sensor either not at all or only insignificantly. A locally higher density of the filler is sufficient to protect the measuring resistor from the detrimental influences of unavoidable vibrations. At the same time, the areas of lower packing density, compared with the before-mentioned areas, prevent failures produced by excessive thermal stresses.

Further, a locally reduced packing density of the filler in the area of the measuring resistor, adjacent a locally higher packing density, provides the advantage that the risk of damage to the measuring resistor, which as such likewise is a ceramic component built up on a ceramic or mineral substrate, especially on a board, will be reduced during packing of the filler.

The closure of the protective tube, preferably provided according to the invention, is suited not only for retaining the filler in the protective tube but also for maintaining the irregular packing density of the filler in the protective tube in spite of the vibrations that tend to balance out the difference in packing density, because the closure reduces the room for redistribution of the filler in the protective tube. It is especially favorable for this purpose if the filler is pre-stressed mechanically by the closure. In that case a locally increased packing density, i.e. a further maximum of the packing density, will be obtained in front of the closure.

Preferably, a maximum of the packing density is provided at the rear end of the protective tube. This is suitable for fixing the at least one supply line of the measuring resistor, which is brought out through the rear end of the protective tube, at that point of the protective tube. This has been found to be favorable not only with respect to the cohesive strength of the temperature sensor, but also with respect to its resistance to vibrations. Variations in length of the supply line produced by temperature ramps can take effect in the lower density filler areas without any risk of failure of a supply line, in spite of the fixed point existing in the area of the additional maximum of the packing density at the rear end of the protective tube.

Advantageously, a locally higher density of the filler is provided in the area where the measuring resistor is located so that the latter is packed in the filler directly and firmly at that point. Alternatively, it is also possible to provide a locally higher density of the filler directly adjacent the measuring resistor. This provides the advantage to reduce the risk of damage to the measuring resistor through the filler compacting process. The two measures can be combined advantageously one with the other, in which case the degree of compaction may be lower.

Local compaction can be achieved by restricting the cross-section of the protective tube from the outside, for example by means of a crimping tool. In the area around the measuring resistor, restriction of the protective tube should be limited so that the inner diameter of the protective tube remains larger than the space taken by the measuring resistor.

By having the cross-section of the protective tube restricted by a subsequent step, the filler is subjected to a local mechanical pre-stress.

Preferably, the closure means comprises a stopper through which the at least one supply line of the measuring resistor is passed in electrically insulated relationship. The stopper may by pressed into the protective tube and may be fixed in it in such a way that a pre-stress is maintained in the filler in front of the stopper. One way of achieving this consists in providing the rear end of the protective tube with an external thread and pressing the stopper into the protective tube through a cap nut that is screwed onto the protective tube. In order to prevent slackening of the cap nut it can be secured in the pre-stressed position by soldering, welding or caulking. A much simpler, cheaper and, consequently, especially preferred solution is provided by a further development of the invention where the stopper is pressed into the protective tube and is secured in its position by inwardly flanging the edge of the protective tube. Other convenient ways of fixing the stopper in its position while maintaining the pre-stress of the filler material consist in securing the stopper in its position by pins, or by caulking or squeezing of the protective tube in the area of the stopper.

When the filler is pre-stressed mechanically by the closure, a maximum of the packing density occurs at the closure. However, a maximum of the packing density may also be found at other points, for example midway between the closure and the measuring resistor. At such a point, a maximum of the packing density can likewise be obtained by a restriction in cross-section of the protective tube at the respective point, which is produced from the outside by plastic deformation of the protective tube in that area. This can be achieved, for example, by hammering or squeezing. The serviceability of the temperature sensor is not impaired by any such action. Starting from such a centrally located maximum of the packing density, any thermally induced variation in length of the supply lines may occur in both directions, without any detrimental effects.

In the first line, a maximum of the packing density occurs at the measuring resistor or in its neighborhood.

Preferably, two or maximally three maxima of the packing density are found along the protective tube, i.e. one or two in the area of the measuring resistor or near the measuring resistor, and another one at the closure on the rear end of the protective tube. This is especially favorable with respect to the desirable durability of the temperature sensor.

The lower packing density is obtained, for example, when the protective tube is filled with the filler in powder form in the presence of vibration. In contrast, local compaction is obtained by subsequent local restriction in diameter of the protective tube and by pressure exerted on the closure.

A filler especially well suited is magnesium oxide, being highly temperature-resistant, available at low cost and easy to work. Further suited as fillers are aluminum oxide, aluminum nitride and polysilicates in powder form, and mixtures thereof. However, this list does not contain an exhaustive enumeration of all suitable fillers, being only meant to describe a few examples of fillers that are especially well suited. In addition to ceramic and mineral fillers in powder form, ceramic casting compounds, ceramic adhesives and heat-transfer elements are likewise suited as fillers. One example of a suitable ceramic casting compound, which sets by chemical reaction and which is stable at 1650°, is sold by Panasol-Elosol GmbH in D-61440 Oberursel, under the trade name Cerastil V336.

An example of a suitable ceramic adhesive is sold by Cotronics Corp. in Brooklyn, N.Y. 11235, under the trade name Cotronics 906.

Suitable for use as measuring resistors in the temperature range of 600° C. to approximately 1000° C. are ceramic NTC resistors, i.e. ceramic measuring resistors with negative temperature coefficient. Flat measuring resistors are especially preferred for purposes of the invention. Flat measuring resistors consist of a metallic resistance material that is printed onto a flat ceramic carrier, also described as a substrate. Aluminum oxide wafers have proven their value as substrates. As a protective measure for the resistance material the latter may also be sandwiched between two ceramic wafers or plates. Measuring resistors made from platinum or a platinum alloy, especially Pt-100 or Pt-200 resistors, i.e. platinum resistors having a resistance of 100 ohms or 200 ohms, respectively, at a temperature of 0° C., are particularly well suited. Such resistors may be printed onto an aluminum substrate and may have connection wires made from a corresponding highly temperature-resistant metal, for example likewise from platinum or a platinum alloy. In most of the cases, however, connection wires made from platinum have a short length only and are extended in length by low-cost connection wires made from a different highly temperature-resistant metal, such as Inconel 600, Inconel 601 or Inconel 602.

Protective tubes that are capable of withstanding the high temperatures and chemical attack in the exhaust gas are known. Examples include highly temperature-resistant nickel alloys, for example Inconel alloys, especially Inconel 600, Inconel 601 and Inconel 602. Inconel alloys are a family of highly temperature-resistant nickel-based superalloys that are particularly resistant to oxidation and other corrosion. Inconel 600, for example, contains 72% nickel, 16% chromium and 8% iron.

According to a modification of the invention, part of the filler material is replaced by a ceramic tube which is embedded in the filler material and is provided, for each of the supply lines of the measuring resistor that are brought out through the rear end of the protective tube, with a separate hole for accommodating each supply line separately, leading from the measuring resistor to the closure. Such a ceramic tube provides the advantage that a given position of the supply lines in the protective tube, and their insulation relative to the protective tube and one relative to the other, can be realized more easily during production of the temperature sensors. Ceramic two-slot tubes, made from aluminum oxide, are available at low cost. Conveniently, the clear width of the slots in the ceramic tube is closely adapted to the diameter of the supply lines that are to be received by them so that on the one hand the lines will be protected from vibration and, on the other hand, relative movement between the ceramic tube and the supply lines received in them is allowed in the case of thermally induced variations in length of the supply lines.

Conveniently, the ceramic tube leads directly from the measuring resistor to the closure. Preferably, it is firmly connected with the measuring resistor, especially by a ceramic bond. In that case, the measuring resistor can be easily positioned in the protective tube using the ceramic tube. According to an especially preferred solution, the ceramic tube is guided right into the closure or even through the closure so that the closure, which preferably is to pre-stress the filler, will not be required to pre-stress the ceramic tube in lengthwise direction as well. Once the closure has been fixed in its position, the ceramic tube can be connected with the closure, for example by ceramic bonding.

If a point of maximum packing density of the filler is desired in the central area between the closure and the resistor, for fixing the supply lines, that area can be obtained by correspondingly restricting the cross-section of the protective tube in this case as well. In that case, it may happen that the ceramic tube gets locally destroyed, but once the ceramic tube has been positioned in the filler this will be of no consequence. There remains the possibility for the supply lines, on both sides of the restricted point, to expand thermally without any detrimental effects. The supply lines being held loosely in the ceramic tube, no forces can be transmitted from the ceramic tube to the supply lines in case temperature ramps should occur, and as a result no tensile or compressive stresses can build up that could lead to the supply lines being torn off.

It is a particular advantage of the invention that the temperature sensor can be prefabricated in standard dimensions and can then be connected to a holder adapted to the conditions of the particular application, to form a temperature sensor ready for being mounted, for example for being screwed in.

BRIEF DESCRIPTION OF THE SEVERAL VIEWS OF THE DRAWINGS

Certain embodiments of the invention are illustrated in the attached drawings in which identical or corresponding parts are indicated by identical reference numerals.

DETAILED DESCRIPTION OF THE INVENTION

Figure 1:
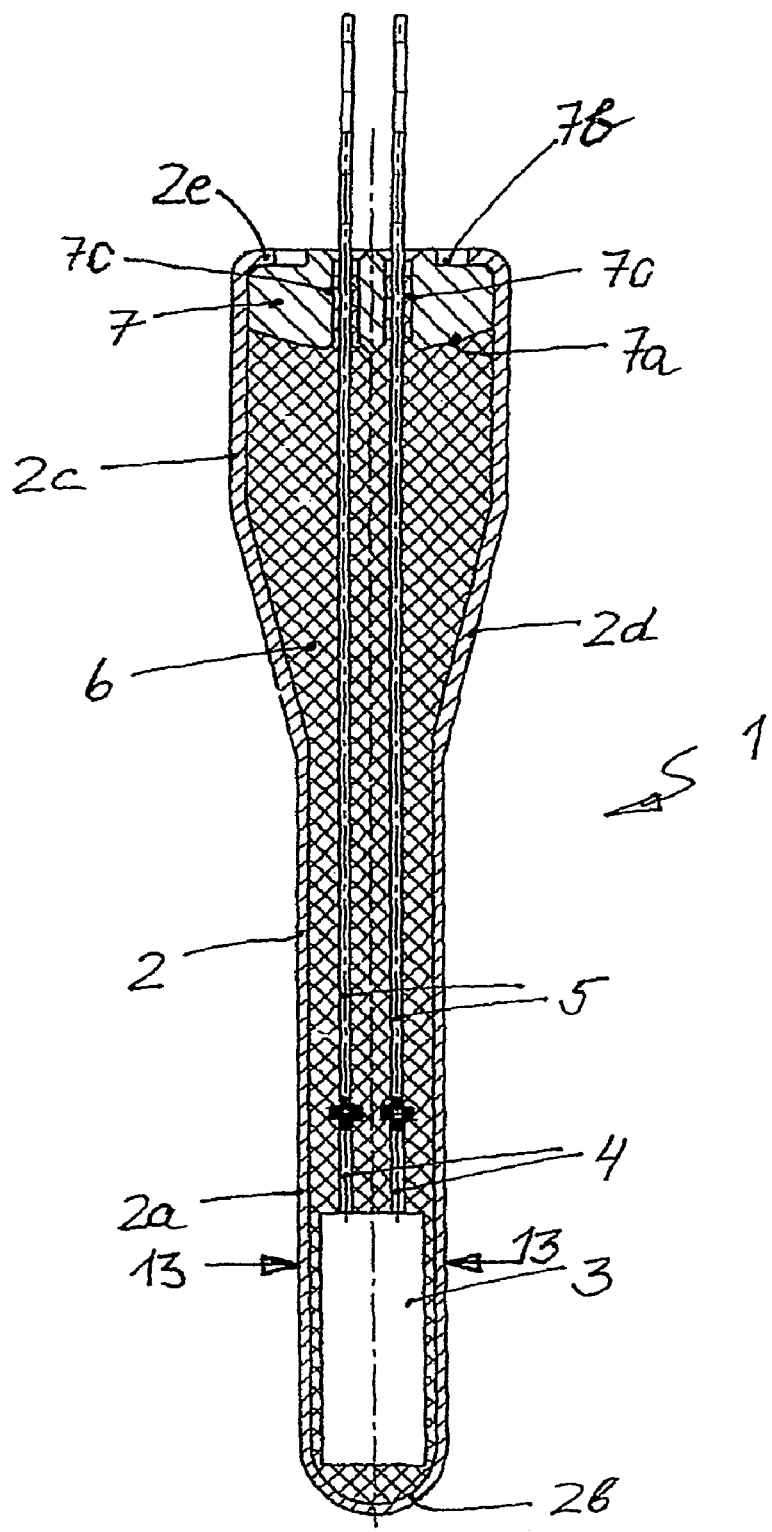
FIG. 1 shows a longitudinal cross-section of a first embodiment of a temperature sensor.

The temperature sensor 1 illustrated in FIG. 1 comprises a measuring resistor 3 with supply lines 4, extended in length by supply wires 5, in a protective tube 2. The measuring resistor 3, the supply lines 4 and the supply wires 5 are embedded in a ceramic or mineral filler 6.

Preferably, the measuring resistor 3 is a thin ceramic plate on which a platinum resistor is printed.

The protective tube 2 has a slim cylindrical forward section 2a with a closed rounded tip 2b, a cylindrical rear section 2c of a diameter larger than the diameter of the forward section 2a, and a conical transition portion 2d. Alternatively, the tip 2b may be flat and/or the transition portion 2d may be stepped.

The measuring resistor 3 and the diameter of the forward portion 2a of the protective tube are adapted one to the other so that an unnecessarily big spacing is avoided between the measuring resistor 3 and the protective tube 2.

The protective tube 2 is made from a highly heat-resistant material, for example from Inconel 600, Inconel 601 or Inconel 602. The filler 6 consists, for example, of magnesium oxide powder, aluminum oxide powder, aluminum nitride powder or of mixtures thereof. After the measuring resistor 3 has been introduced into the protective tube 2, the filler 6 is filled in so as to enclose the measuring resistor 3, its supply lines 4 and the supply wires 5. This can be done by filling the material in by steps while simultaneously tapping and/or shaking the tube. The protective tube 2 is closed using a stopper 7 that consists of a metallic or ceramic molded part having a spherical front surface 7a and a stepped rear surface 7b; alternatively, the front surface 7a may be flat and/or the rear surface 7b may be flat. The stopper 7 is provided with a continuous hole 7c for each of the two supply wires 5. Using the stopper 7, the filler is pressed into the protective tube 2 from the rear and is further compacted. According to the invention, the filler 6 exhibits a non-uniform packing density. In any case, when the stopper 7 is made from metal, the filler 6 also extends into the passages 7c in the stopper 7, thereby insulating the supply wires 5 from the stopper 7. The stopper 7 is held in the protective tube 2 by the edge 2e of the protective tube 2 which is flanged to the inside. Flanging of the edge 2e is preferably carried out during forced introduction of the stopper 7 into the protective tube 2 with the result that the filler 6 will be mechanically pre-stressed and that the pre-stress will be maintained by the flanged edge 2e of the protective tube 2.

The packing density of the filler 6 reaches a maximum in an area surrounding the measuring resistor 3 and another maximum in front of the spherical front surface 7a of the stopper 7. The position of the maximum at the measuring resistor 3 is indicated in the Figures by arrows 13; the maximum can be obtained by subsequent restriction in cross-section of the protective tube 2.

Figure 2:
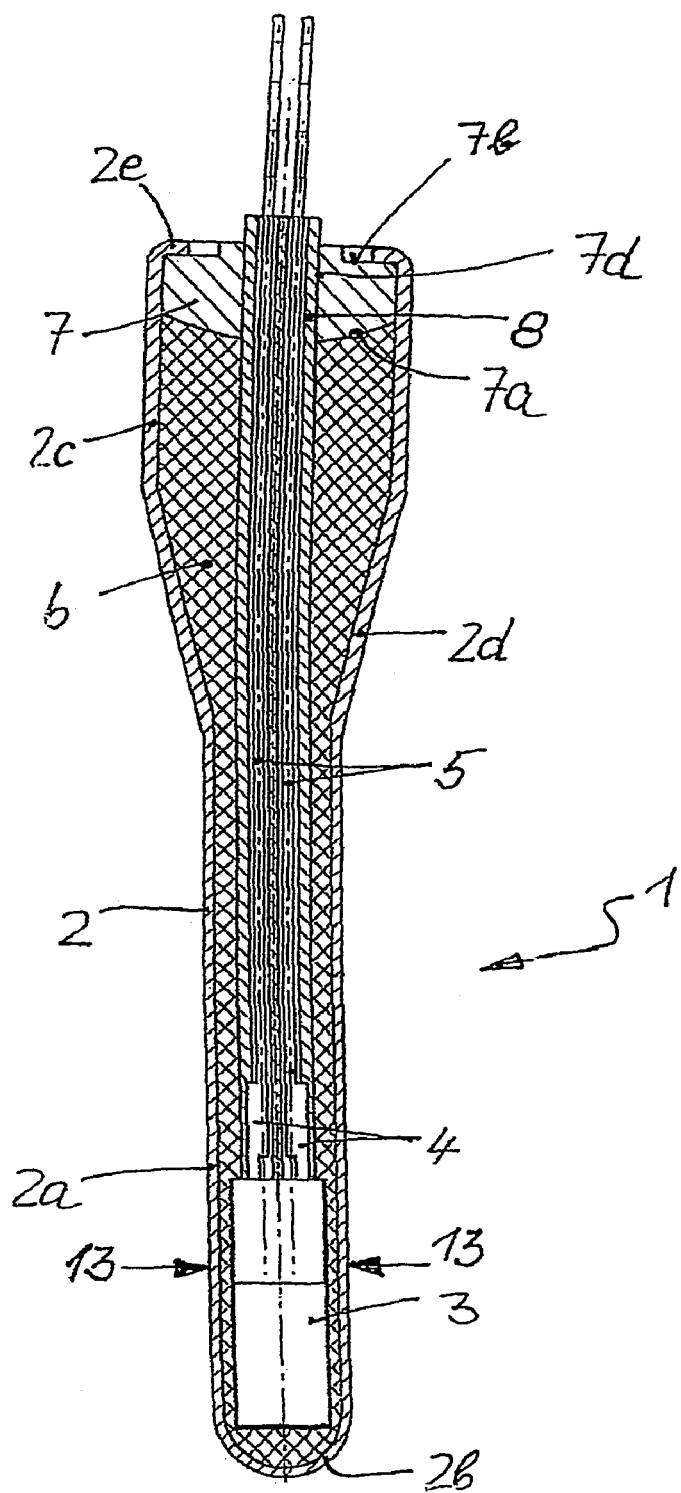
FIG. 2 shows a longitudinal cross-section of a second embodiment of a temperature sensor.

The embodiment illustrated in FIG. 2 differs from that shown in FIG. 1 in that the measuring resistor 3 is firmly connected with a ceramic tube 8 having two holes of channels, especially with a tube 8 made from aluminum oxide. The two holes of channels of the tube 8 accommodate the two supply wires 5 in insulated relationship one relative to the other. Instead of two passages 7c, the stopper 7 has one central passage 7d only that accommodates the rear end of the ceramic two-hole tube 8. Conveniently, the diameter of the passage 7d and the outer diameter of the two-hole tube 8 are closely adapted one to the other so that the two-hole tube 8 is tightly guided in the stopper 7.

For producing the temperature sensor 1, the assembly consisting of the measuring resistor 3 and the two-hole tube 8 is introduced into the protective tube 2, the filler is filled in and is compacted non-uniformly, in the area of the measuring resistor 3 for example by crimping as proposed by the invention, is additionally pre-stressed by means of the stopper 7, whereafter the stopper 7 is secured in its position by inwardly flanging of the rear edge 2e of the protective tube 2.

Figure 3:
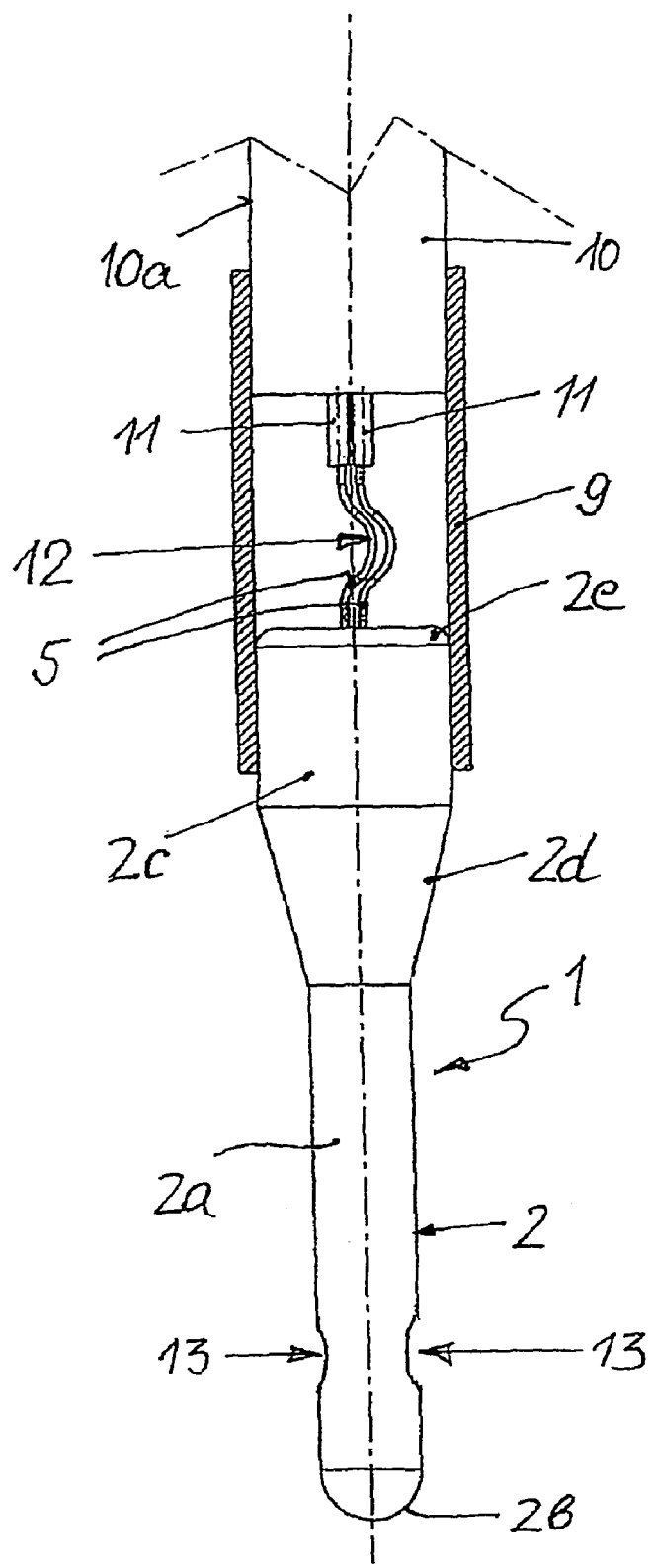
FIG. 3 shows a side view of the temperature sensor illustrated in FIG. 1, mounted in a holder.

FIG. 3 shows the connection between the temperature sensor according to FIG. 1 and a holder 9, which may consist of a metallic sleeve, one end of which is slid onto the rear portion 2c of the protective tube 2 and is connected with the latter, conveniently be welding. A connection cable 10 may be introduced into the other end of the holder 9, for connection of its two inner conductors 10 with the supply wires 5 of the temperature sensor 1. The connection may be realized by welding, brazing or crimping.

Conveniently, the connection cable 10 has a metal sheath 10a from which the inner conductors 11 are insulated by a ceramic or mineral insulating material. Especially well suited as insulating material are aluminum oxide and magnesium oxide. The metallic sheath 10a of the connection cable 10 is conveniently connected with the holder 9 by welding. In order to ensure that the exposed section of the connection wires 5 will not be overloaded as a result of thermal expansion, they are provided with a compensating bend 12.

For adapting the unit to different operating conditions, the holder 9 may be provided, for example, with a mounting flange or a threaded bush that permits the temperature sensor 1 to be screwed in at the site.

The temperature sensor 1 can be used as a standard component and can be connected with connection cables 10 of different lengths.

The temperature sensor 1 illustrated in FIG. 2 can be connected with a holder 9 and a connection cable 10 in the same manner as illustrated in FIG. 1.

LIST OF REFERENCE NUMERALS

1. Temperature sensor
2. Protective tube
2a. Forward section
2b. Rounded tip
2c. Rear section
2d. Transition portion
2e. Edge
3. Measuring resistor
4. Supply line
5. Supply wires
6. Filler
7. Stopper
7a. Front surface
7b. Rear surface
7c. Passage
7d. Passage
8. Two-hole tube
9. Holder
10. Connection cable
10a. Sheath
11. Inner conductor
12. Compensating bend
13. Position of the maximum of the packing density

The invention claimed is:

1. Temperature sensor for a resistance thermometer comprising
   an electric measuring resistor the resistance material of which consists either of a ceramic material or of a metallic resistance material in combination with a ceramic or a mineral carrier,
   a protective tube comprising a closed tip and a rear end that provides an access to the inner space of the protective tube and that contains the measuring resistor closely adjacent the closed tip of the protective tube,
said protective tube having a restriction at the location of a maximum of packing density of a filler, the restriction being a reduced portion of the protective tube, the protective tube having a wider portion on each side of the reduced portion, the packing density being a maximum at the reduced portion and being less than a maximum on each side of the reduced portion,
   at least one supply line that is brought out through the rear end of the protective tube,
and an electrically insulating filler based on a ceramic or a mineral material that fills the space between the protective tube on the one side and the measuring resistor and its at least one supply line on the other side,
wherein the packing density of the filler has a gradient in lengthwise direction of the protective tube.

2. The temperature sensor as defined in claim 1, wherein a closure is provided at the rear end of the protective tube, which closure retains the filler in the protective tube and through which the at least one supply line is brought out at the rear end of the protective tube.

3. The temperature sensor as defined in claim 1, wherein a maximum of the packing density of the filler is located in the neighborhood of the measuring resistor.

4. The temperature sensor as defined in claim 1, wherein a maximum of the packing density of the filler is located at the measuring resistor.

5. The temperature sensor as defined in claim 1, wherein two or maximally three maxima of the packing density of the filler exist along the protective tube.

6. The temperature sensor as defined in claim 1, wherein the at least one supply line extends in the protective tube predominantly in an area of a minimum of the packing density of the filler.

7. The temperature sensor as defined in claim 1, wherein the filler is subjected to a mechanical pre-stress in the area of its maximum packing density.

8. The temperature sensor as defined in claim 1, wherein magnesium oxide and/or aluminum oxide and/or aluminum nitride in powder form are provided as the filler.

9. The temperature sensor as defined in claim 1, wherein a ceramic casting compound, a ceramic adhesive or a highly temperature-resistant heat-transfer paste is provided as filler.

10. The temperature sensor as defined in claim 1, wherein the measuring resistor has a negative temperature coefficient.

11. The temperature sensor as defined in claim 1, wherein the measuring resistor is a flat measuring resistor.

12. The temperature sensor as defined in claim 1, wherein the measuring resistor is formed using platinum or a platinum alloy.

13. The temperature sensor as defined in claim 12 in which the measuring resistor is a Pt-100 or Pt-200 resistor.

14. The temperature sensor as defined in claim 1, wherein a ceramic tube embedded in the filler comprises a separate hole for each supply line of the measuring resistor, for accommodating the respective separate supply line and leading it from the measuring resistor to a closure.

15. The temperature sensor as defined in claim 14, wherein the ceramic tube ends in a passage or outside of a passage provided in the closure to fit the ceramic tube.

16. The temperature sensor as defined claim 1, wherein a closure comprises a stopper through which passes the at least one supply line of the measuring resistor in electrically insulated relationship.

17. The temperature sensor as defined in claim 16, wherein the packing density of the filler exhibits a further maximum in front of the stopper.

18. The temperature sensor as defined in claim 16, wherein the stopper is retained in its position by inwardly flanging the rear end of the protective tube.

19. The temperature sensor as defined in claim 1, wherein the protective tube consists of a metal.

20. The temperature sensor as defined in claim 19, wherein the protective tube consists of a highly temperature-resistant alloy.

21. The temperature sensor as defined in claim 19 in which the alloy is an Inconel® nickel alloy.

* * * * *